A. J. HODGE.
GAS REGULATOR.
APPLICATION FILED MAR. 11, 1912.
1,097,322.                                                Patented May 19, 1914.
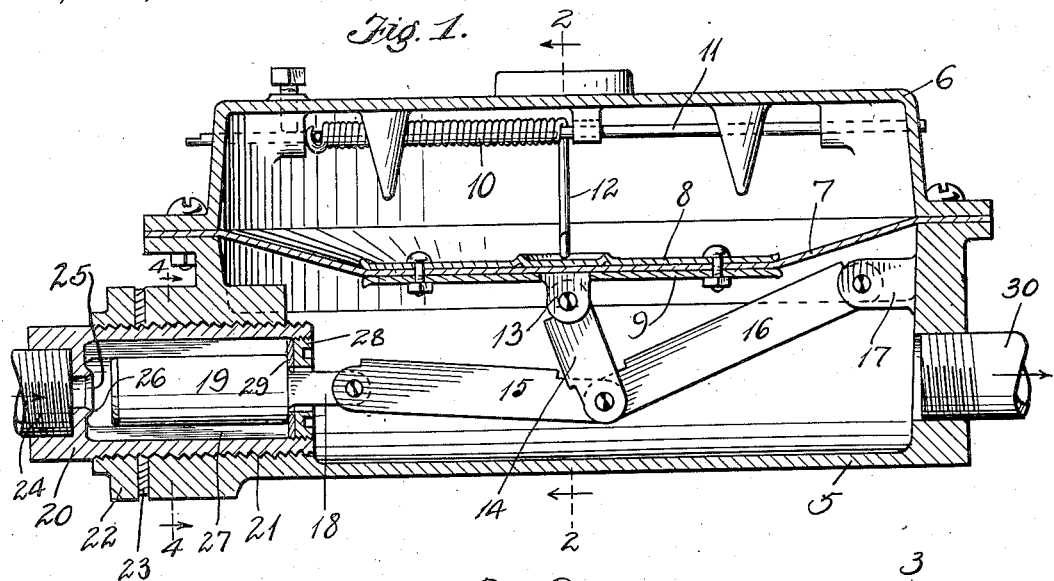
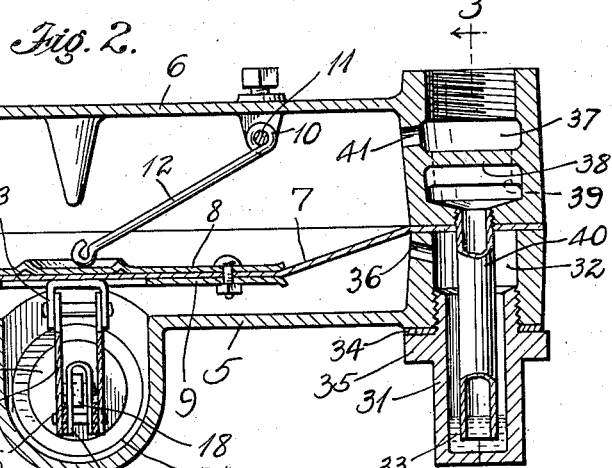
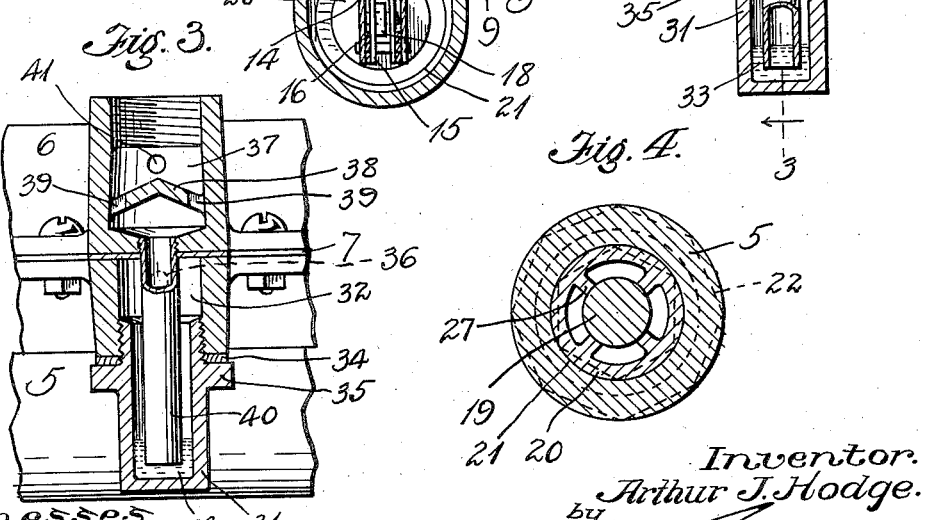
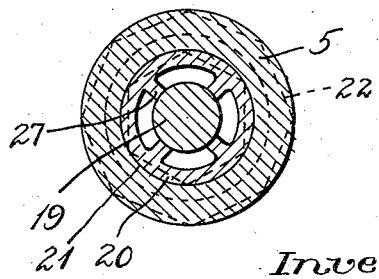
Inventor.
Arthur J. Hodge.

UNITED STATES PATENT OFFICE.

ARTHUR J. HODGE, OF PASADENA, CALIFORNIA.

GAS-REGULATOR.

1,097,322.  Specification of Letters Patent.  Patented May 19, 1914.

Application filed March 11, 1912. Serial No. 682,929.

*To all whom it may concern:*

Be it known that I, ARTHUR J. HODGE, a citizen of the United States, residing at Pasadena, in the county of Los Angeles and State of California, have invented new and useful Improvements in Gas-Regulators, of which the following is a specification.

This invention relates to improvements in gas regulators and has particular relation to devices adapted to be interposed between gas mains and the service pipes of buildings, dwellings or the like.

It is an object of the invention to provide a regulator in which a valve is positively moved by a pressure receiving diaphragm and in which an adjustable valve seat is employed for coöperating with the said valve.

It is also an object of the invention to provide a regulating valve mechanism in which a safety outlet is provided in the event of the valve becoming defective or not capable of holding the pressure from the mains.

In the accompanying drawing forming a part of this specification, Figure 1 is a transverse sectional central view through a valve regulator embodying the features of this invention. Fig. 2 is a transverse sectional view taken upon the line 2—2 of Fig. 1. Fig. 3 is a detail sectional view taken upon the line 3—3 of Fig. 2. Fig. 4 is a detail sectional view taken upon the line 4—4 of Fig. 1.

The details and features of the invention will now be more particularly described, reference being had to the said drawing in which 5 indicates a casing and 6 a cover therefor. Within the casing and between it and the cover 6 is a diaphragm 7 of flexible material, the central portion of said diaphragm being stiffened and protected by means of plates 8 and 9. The outer edges of the diaphragms are clamped tightly between the flanges of the casing and the cover 6. A spring 10 mounted upon a shaft 11 carried by the cover 6 is provided with a projecting end portion 12 adapted to press against the diaphragm at its central point for forcing it into the casing 5. The central portion of the plate 9 is provided with a projecting standard 13 which is connected by a link 14 with the joined ends of toggle links 15 and 16. The link 16 is pivoted to a suitable standard 17 carried by the said casing while the link 15 is pivotally connected with the stem 18 of a valve 19.

The mechanism thus far described is quite similar to that shown and described in my Patent No. 806,470 granted Dec. 5, 1905. The present regulator is for an improvement upon the structure shown in the former patent referred to. The casing is provided with an adjustable valve seat member 20 which is exteriorly threaded and adapted to be screwed into a threaded opening 21 formed in the casing 5. A lock nut 22 carried by the said seat member 20 is adapted to be screwed tightly against the casing, a washer 23 being interposed between the parts, for holding the valve seat member after it has been properly adjusted.

It will be observed that the toggles have a rigid or fixed fulcrum in the standard 17 and that the valve 19 itself, is positively connected with the said toggle and that the valve seat member 20 is the adjustable feature of the mechanism, whereby the valve can be caused to properly seat in controlling the inlet of pressure to the casing 5. The said valve seat member 20 is connected at its outer end with a supply pipe 24 connected with the gas mains and the gas entrance in the valve seat member is through an opening 25, usually of less diameter than the pipe 24 and formed with a raised valve seat 26 around its inner end. The end of the valve 19 is adapted to be forced against said seat 26, when the toggle has been brought to an approximately straight position so that the inlet of gas will be cut off.
The said valve is preferably cylindrical and moves within the valve seat member 20, being held centrally therein by means of a plurality of ribs 27 formed upon the inner surface of the member 20. The inner end of the valve seat member 20 is interiorly screw threaded and adapted to receive a ring nut 28, a washer 29 being mounted upon the inner surface thereof and being forced against the ends of the ribs 27. The inner end of the valve 19 is adapted to seat against the inner edges of said washer, when for any cause pressure is not great enough in the casing to overcome the action of the spring. The casing 5 is also provided with a service pipe 30, which extends into the house or dwelling which is to be supplied with the gas under reduced pressure. The action of the valve 19 is such, that when a proper amount of pressure has been introduced into the casing 5, and the pipe 30, the diaphragm will be moved so as to straighten the toggle and force the valve 19 against the seat 26. When the pressure through the use of the gas, has been somewhat reduced within the casing 5 the diaphragm will move inwardly in said casing under the influence of the spring 12 and operating the toggle for drawing the valve 19 away from the seat 26 and admitting an additional pressure to the regulator and to the service pipe 30.

In the event of a break in the service pipe or a leak such as would cause an unusual flow of gas, the pressure in the pipe 24 will cause the valve 19 to seat against the washer 29 and the ring nut 28 and thus check a leakage of the gas. The regulator is further provided with a safety means which is useful in protecting the regulator when the valve 19 does not operate properly for any reason, or when leakage past said valve occurs, such safety mechanism comprising a cup 31 which has a threaded end portion, adapted to screw into an interiorly threaded opening 32 formed in the casing 5. The lower end of said cup is closed and normally holds a small quantity of quicksilver 33 or other sealing means. A gasket 34 is interposed between a flange 35 on said cup and the adjacent casing for making a gas tight joint between the parts. The gas pressure is admitted into the opening 32 through a small passage 36. The cover 6 is provided with a passage 37 which is open at its outer end to the atmosphere and which is provided with a transverse baffle plate 38 therein. Passages 39 are formed at the edges of the baffle plate to allow the escape of pressure through the mechanism. The lower end of the passage 37 is formed with a converging floor leading to a pipe 40. The said pipe is of less diameter than the bore of the cup 31 and is made of such a length as to extend into said cup and nearly to the bottom thereof, its lower end being normally immersed.

The pressure within the casing 5 and the service pipe 30 is normally not sufficient to force the quicksilver from its position in the cup 31. If however, the valve 19 should become leaky and permit an undue amount of pressure to enter the casing 5 so as to endanger the regulator, the quicksilver would be forced upwardly in the pipe 40 until the seal produced thereby at the lower end of the said pipe, was broken and the excess of pressure would then escape past the same into the passage 37 and thence to the atmosphere. Any globules or small portions of quick silver that might be carried upwardly by the excessive pressure will be prevented from passing out of the chamber 37 by the angular baffle 38 and will drop back into the bottom of the passage 37 and roll into the tube 40 so as to return to the cup 31. The passage 37 is also provided with a small opening 41 leading into the casing 6. The regulator is thus positively protected against danger from an over accumulation of pressure within the regulator or the entrance of an undue amount of said pressure from the mains. The operation of the mechanism will be readily understood from the above description and will therefore need no further statement.

What I claim is:

A gas regulator comprising a casing, a reciprocating valve mounted therein, mechanism for actuating the same in accordance with the pressure in the regulator, a valve seat member adjustably mounted in the casing and having an integral valve seat coöperating with one end of the said reciprocating valve for controlling the incoming pressure, said valve member having guiding ribs within the same for holding the valve centrally therein and forming a seat for a gasket, a ring nut secured in the inner end of said valve seat member and a gasket held thereby for coöperating with the inner end of the valve.

In witness that I claim the foregoing I have hereunto subscribed my name this 29th day of February, 1912.

ARTHUR J. HODGE.

Witnesses:
EDMUND A. STRAUSE,
EARLE R. POLLARD.